United States Patent
Koba et al.

(10) Patent No.: US 7,506,986 B2
(45) Date of Patent: Mar. 24, 2009

(54) PROJECTION TYPE VIDEO DISPLAY

(75) Inventors: Hiroki Koba, Osaka (JP); Shinichi Shiotsu, Osaka (JP); Motoshi Tahara, Nara (JP); Katsumi Terada, Kyoto (JP); Hideki Yamamoto, Kyoto (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 175 days.

(21) Appl. No.: 11/050,787

(22) Filed: Jan. 27, 2005

(65) Prior Publication Data

US 2005/0231962 A1  Oct. 20, 2005

(30) Foreign Application Priority Data

Jan. 30, 2004 (JP) ............... 2004-022790
Jul. 29, 2004 (JP) ............... 2004-222180

(51) Int. Cl.
G03B 21/14 (2006.01)
G03B 21/22 (2006.01)
G03B 21/20 (2006.01)
F21V 7/00 (2006.01)

(52) U.S. Cl. ............ 353/98; 353/119; 353/87; 353/97; 353/99; 362/296; 362/368; 362/297; 362/300; 362/310; 362/311

(58) Field of Classification Search ............ 353/85–87, 353/52, 55, 97–99, 119; 362/345, 293, 294, 362/373, 263, 264, 296, 297, 300, 306–311, 362/368; G03B 21/20; F21V 07/10
See application file for complete search history.

(56) References Cited

U.S. PATENT DOCUMENTS 2,914,979 A   12/1959  Gretener
3,944,320 A   3/1976   McLintic
4,924,134 A * 5/1990   Westlund et al. ............ 313/113
4,959,762 A   9/1990   Soileau
6,056,405 A * 5/2000   Heintz et al. ................. 353/85
6,398,366 B1  6/2002   Hara et al.

(Continued)

FOREIGN PATENT DOCUMENTS

| CN | 1223895 C | 10/2005 |
|----|-----------|---------|
| DE | 89 06 325 U1 | 11/1989 |
| DE | 100 65 423 A1 | 7/2001 |
| JP | 2001-185080 A | 7/2001 |

(Continued)

OTHER PUBLICATIONS

European Search Report dated Jun. 28, 2006 issued in corresponding European Application No. 05250373.7.

(Continued)

*Primary Examiner*—Diane I Lee
*Assistant Examiner*—Magda Cruz
(74) *Attorney, Agent, or Firm*—Westerman, Hattori, Daniels & Adrian, LLP.

(57) ABSTRACT

A light source comprises a lamp such as an ultra-high pressure mercury lamp or a metal halide lamp and its irradiated light is emitted after being parallelized by a parabolic reflector. The parabolic reflector is made by pressing metal such as stainless and its light exit side aperture is covered with a transparent plate made of glass, etc. The transparent plate prevents fragments of glass of the lamp and the like from scattering when the lamp bursts. The parabolic reflector does not have an aperture (cut-out) for ventilation, but heat radiation fins are formed on the outer surface of it.

6 Claims, 2 Drawing Sheets

U.S. PATENT DOCUMENTS

| | | | |
|---|---|---|---|
| 6,509,674 B1 | 1/2003 | Nakagawa | |
| 6,588,917 B1 * | 7/2003 | Halasz | 362/188 |
| 6,762,559 B1 | 7/2004 | Ishikawa et al. | |
| 6,899,444 B1 * | 5/2005 | Biber et al. | 362/345 |
| 2002/0080612 A1 * | 6/2002 | Ozawa et al. | 362/268 |
| 2003/0086271 A1 * | 5/2003 | Masuoka et al. | 362/345 |

FOREIGN PATENT DOCUMENTS

| | | |
|---|---|---|
| JP | 2002-216531 | 8/2002 |
| JP | 2002-367417 A | 12/2002 |
| WO | WO 02/39013 A | 5/2002 |

OTHER PUBLICATIONS

Office Action dated Oct. 12, 2007 in Corresponding Chinese Patent Application No. 2004100850341.

Office Action dated Feb. 22, 2008 in Corresponding Chinese Patent Application No. 2004100850341.

Office Action dated May 16, 2008 in corresponding Chinese Patent Application No. 2004100850341.

* cited by examiner

PROJECTION TYPE VIDEO DISPLAY

BACKGROUND OF THE INVENTION

Field of the Invention

The present invention relates to a projection type video display such as a liquid crystal projector, and the like.

A light source for a projection type video display generally comprises a lamp and a parabolic reflector. A conventional parabolic reflector is made of glass (see JP-A-2002-216531).

SUMMARY OF THE INVENTION

However, a light source is heated to high temperature due to generation of heat when a lamp is on. A parabolic reflector made of glass has low efficiency of heat radiation, therefore, the reflector should be provided with an aperture for ventilation in order to secure a passage for cooling air. On the other hand, in preparation for the burst of the lamp, the light source should have a structure to prevent fragments of glass of the lamp and the like from scattering. When the reflector is provided with the aperture for ventilation, it is likely that the fragments of glass of the lamp and the like will be scattered from the aperture for ventilation. Moreover, a parabolic reflector made of glass is liable to cause light leak. Therefore, there are some cases where a vent provided in a casing should have a light-shielding structure.

In view of the foregoing circumstances, it is an object of the present invention to provide a projection type video display equipped with a light source which has high efficiency of heat radiation and yet causes almost no light leak.

In order to solve the above-mentioned problem, a projection type video display that optically modulates light emitted from a light source by a display device and projects a video according to the present invention is characterized in that the light source has a lamp and a concave reflector which reflects light from the lamp and the reflector is made of metal.

Also, in the projection type video display, at least a surface which reflects light from the lamp may be coated with aluminum.

The reflector may be made of aluminum.

The light exit side aperture of the reflector may be covered with a transparent plate.

Heat radiation fins may be formed on an outer surface of the reflector.

A mounting structure may be formed on an outer surface of an edge of a light exit side aperture of the reflector.

The mounting structure may be an engaging part formed in the reflector itself.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
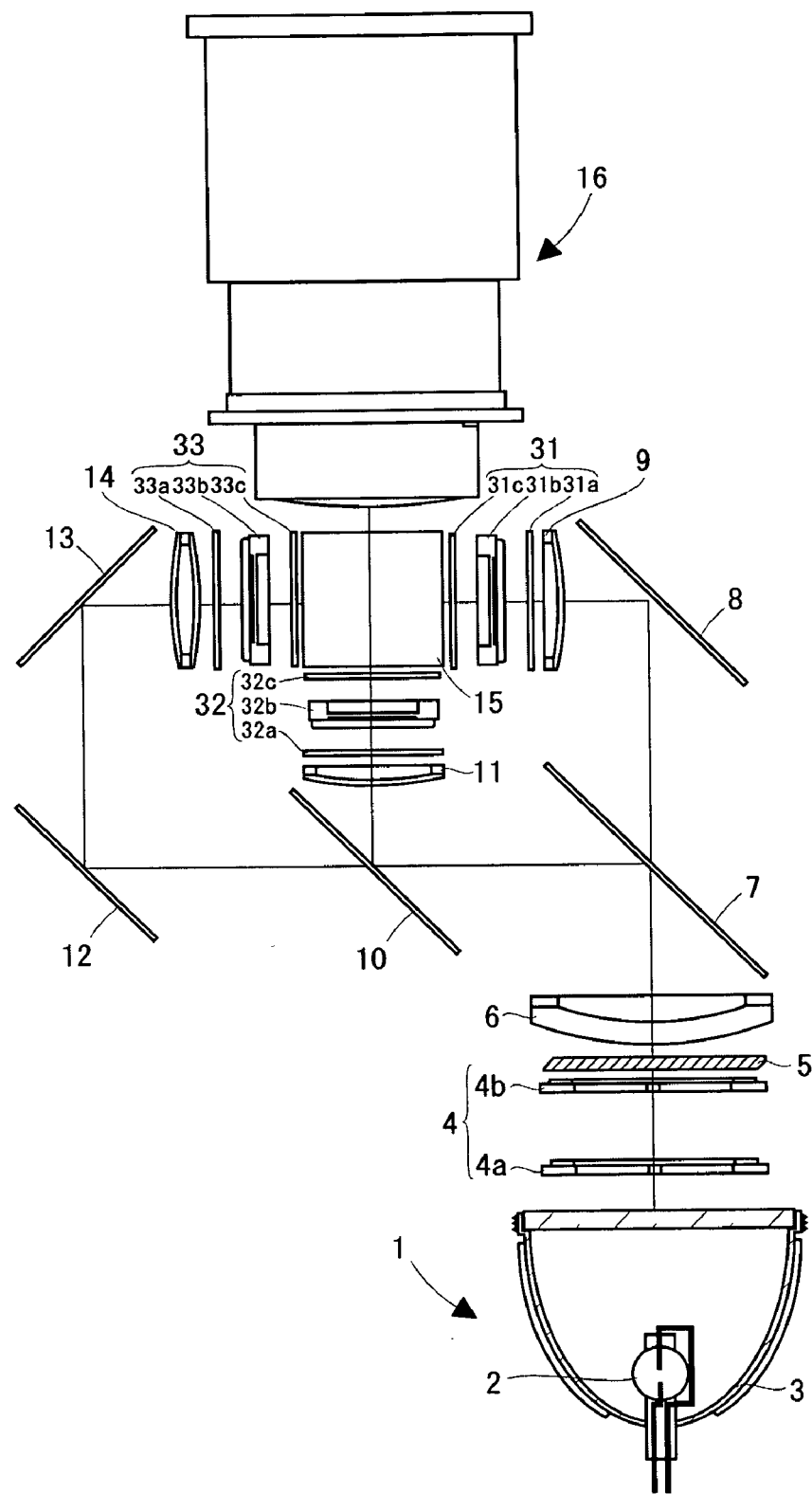
FIG. 1 is a constructional view showing an optical system of a liquid crystal projector according to an embodiment of the present invention.
Figure 2:
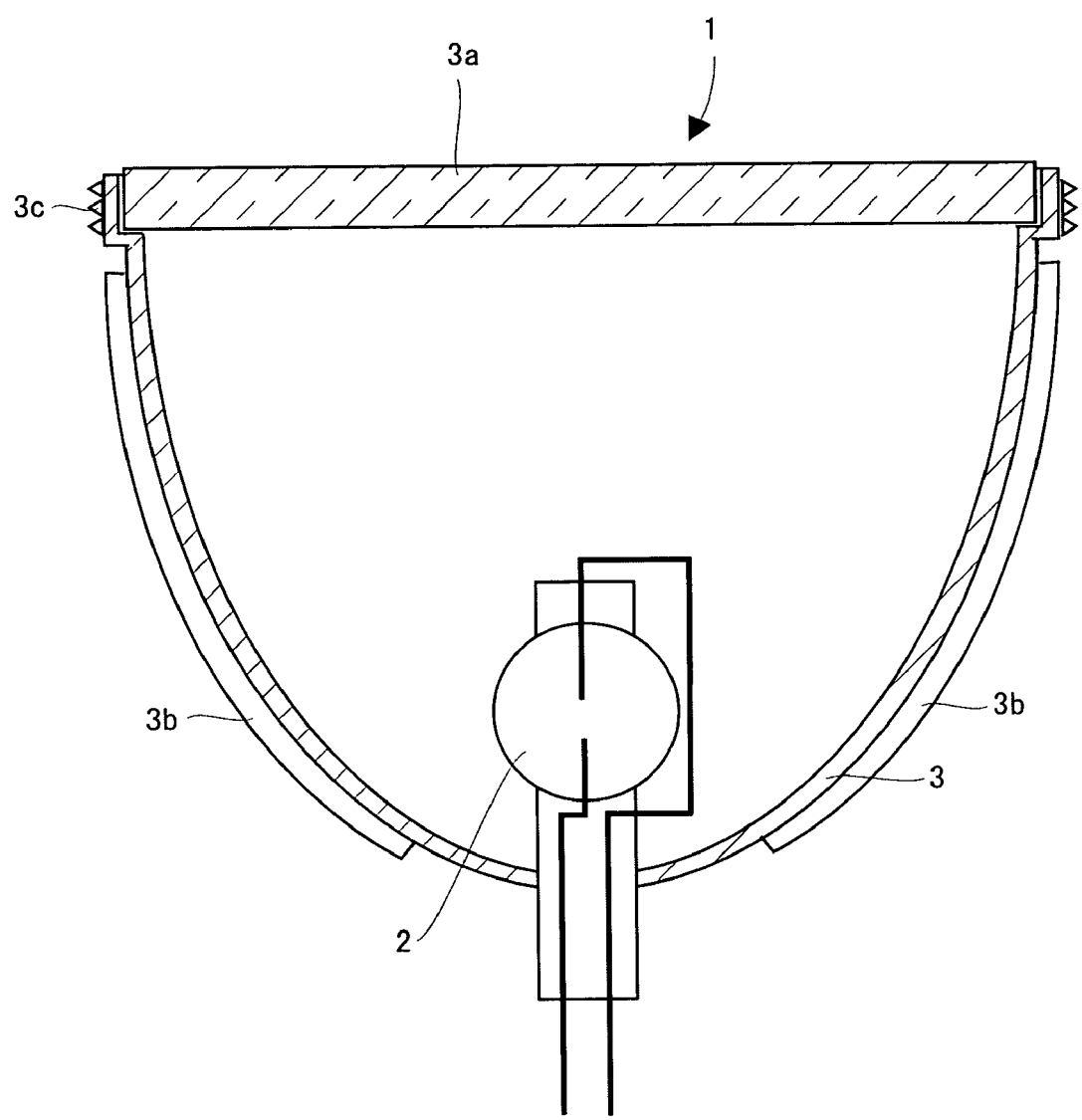
FIG. 2 is an enlarged cross-sectional view showing a light source of the liquid crystal projector shown in FIG. 1.

A liquid crystal projector according to the embodiment 1 of the present invention is now described referring to FIG. 1 and FIG. 2.

FIG. 1 shows a three-panel liquid crystal projector according to this embodiment. A light source 1 comprises a lamp 2 such as an ultra-high pressure mercury lamp or a metal halide lamp, and its irradiated light is emitted after being changed into parallel light by a parabolic reflector 3 and is guided to an integrator lens 4.

The integrator lens 4 is composed of a pair of a group of lenses (fly's eye lenses) 4a and 4b and respective lens portions guide light emitted from the lamp 2 to the whole surface of each liquid crystal light valve 31, 32 and 33 as display devices described later. Therefore, the integrator lens 4 evens off local luminance nonuniformity existing in the lamp 2, thereby decreasing the difference between the light amount at the screen center and the light amount at the screen perimeter. The light which has passed through the integrator lens 4 is guided to a first dichroic mirror 7 after passing through a polarization conversion system 5 and a condenser lens 6.

The polarization conversion system 5 is composed of a polarizing beam splitter array (hereinafter referred to as a PBS array). The PBS array comprises polarization separating surfaces and retardation plates (½ λ plates). The respective polarization separating surfaces of the PBS array transmit, for example, the P polarization of the light from the integrator lens 4 and change the light path of the S polarization by 90 degree. The S polarization having a changed light path is reflected by an adjacent polarization separating surface and is emitted as it is. On the other hand, the P polarization passed through the polarization separating surface is converted into the S polarization by the aforementioned retardation plate provided in the front side (the light emitting side) thereof and is emitted. Namely, in this case, almost all the light is converted into the S polarization.

The first dichroic mirror 7 transmits light in a red wavelength band and reflects light in a cyan (green+blue) wavelength band. The light in the red wavelength band which has passed through the first dichroic mirror 7 is reflected by a reflecting mirror 8 so that its optical path is changed. The red light reflected by the reflecting mirror 8 passes through a lens 9 to be guided to the transmission type liquid crystal light valve for red light 31 and is optically modulated by passing therethrough. On the other hand, the light in the cyan wavelength band which has been reflected by the first dichroic mirror 7 is guided to a second dichroic mirror 10.

The second dichroic mirror 10 transmits light in a blue wavelength band and reflects light in a green wavelength band. The light in the green wavelength band which has been reflected by the second dichroic mirror 10 passes through a lens 11 to be guided to the transmission type liquid crystal light valve for green light 32 and is optically modulated by passing therethrough. The light in the blue wavelength band which has passed through the second dichroic mirror 10 passes through a reflection mirror 12, a reflection mirror 13, and a lens 14 to be guided to the transmission type liquid crystal light valve for blue light 33 and is optically modulated by passing therethrough.

The liquid crystal light valves 31, 32, and 33 respectively comprise light incidence side polarizers 31a, 32a, and 33a, panels 31b, 32b, and 33b constructed by sealing a liquid crystal between a pair of glass plates (having a pixel electrode and an alignment film formed therein), and light exit side polarizers 31c, 32c, and 33c.

The light (image light in respective colors) which have been modulated by respectively passing through the liquid crystal light valves 31, 32, and 33 are mixed by a cross dichroic prism 15, to be full color image light. The full color image light is enlarged and projected by a projection lens 16 and is displayed on a screen (not shown).

A parabolic reflector 3 is made by processing metals such as iron, copper, and various kinds of alloys including stainless steel. When making such parabolic reflectors, processing like casting, die-casting (high-pressure casting) as well as pressing or spinning is used. The parabolic reflector 3 made of metal can efficiently cool the light source 1 due to its high efficiency of heat radiation. Also the parabolic reflector 3 made of metal causes no light leak, therefore a vent of a casing of the video display (not shown) need not have a light-shielding structure. The inner surface of the parabolic reflector 3 is undercoated in order to reduce the unevenness as much as possible, and then metal film having high index of reflection, for example, is evaporated on the undercoated base. Moreover, a topcoat is put on the metal film for protection. A pair of electrodes of the lamp 2 is pulled out of a hole formed on the rear end of the parabolic reflector 3.

An aperture (cut-out) for ventilation is not formed in the parabolic reflector 3. The light exit side aperture of the parabolic reflector 3 is covered with a transparent plate 3a made of glass and the like. The transparent plate 3a is provided in order to prevent fragments of glass of the lamp and the like from scattering in case of burst of the lamp. As mentioned above, the parabolic reflector 3 does not have an aperture (cut-out) for ventilation, thus ensuring that fragments of glass of the lamp and the like are not scattered in case of burst of the lamp. If any malfunction is expected to be caused by expansion of the air in the parabolic reflector 3 when the lamp is on, with the reflector being completely sealed up by the transparent plate 3a, a small aperture (very small aperture that will not let fragments of glass of the lamp and the like pass through) may be provided on the parabolic reflector 3, or some gap may be left on a hole for insertion of the lamp formed on the rear end of the parabolic reflector 3. If a mesh-shaped portion is made by forming a plurality of small apertures mentioned above in the vicinity of light exit side aperture, for example, ventilation would be possible, while preventing fragments of glass and the like from scattering in case of burst of the lamp. The mesh-shaped portion can be made easily in the above-mentioned method, since the parabolic reflector 3 is made of metal.

Heat radiation fins 3b are formed on the outer surface of the parabolic reflector 3. These fins enable the surface area of the parabolic reflector 3 to be substantially enlarged, resulting in higher efficiency of heat radiation. It is desirable that heat radiation fins 3b are arranged in a proper position so as not to interrupt air current generated by a fan (not shown). The direction of the longer side of the heat radiation fins 3b may be matched either with the vertical direction in FIG. 2 or with the horizontal direction in FIG. 2.

Engaging part 3c made by processing the parabolic reflector 3 itself is formed on the outer surface of the edge of the light exit side aperture in the parabolic reflector 3. The engaging part 3c enables the light source 1 to be easily mounted on a mounting structure (not shown). Instead of forming the engaging part 3c, uneven or hook-shaped stopper may be made by processing the parabolic reflector 3 itself. Such mounting structures can be made easily, since the parabolic reflector 3 is made of metal.

Embodiment 2

A parabolic reflector 3 in Embodiment 2 is made of aluminum and its shape is made with the same processing as in Embodiment 1.

A lamp 2 containing mercury such as an ultra high pressure mercury lamp is used as a lamp 2. There is a concern that mercury vaporized by the heat of the lamp 2 will leak out of the lamp 2 and flow out from the gap of the light source 1 in case of the burst of the lamp 2.

However, aluminum has a characteristic that it reacts with mercury to form an alloy (amalgam). Therefore, vaporized mercury leaked out of the lamp 2 reacts with the parabolic reflector 3 made of aluminum to be an alloy, and then the alloy adheres to the reflecting surface of the parabolic reflector 3. As a result, there is no concern that a user will be exposed to mercury and the safety is enhanced.

In Embodiment 2, the parabolic reflector 3 itself is made of aluminum, but it does not mean that the configuration should be limited to the same. Aluminum may be coated on at least a reflecting surface (inner surface) of the parabolic reflector 3, which has possibility of contacting with mercury leaked out of the lamp 2, by using such methods as evaporation or application and the like. This configuration has the same effect as Embodiment 2. Furthermore, aluminum can be used only for a required part, the cost of the reflector can be reduced.

Though a three-panel liquid crystal projector with liquid crystal display panel is shown as a display device both in Embodiment 1 and Embodiment 2, the present invention can be applied also in a projection type video display equipped with other image generating optical system. The present invention can be applied to a rear projection type video display as well as a front projection type video display. Moreover, the present invention can be applied to a projector using DLP (Digital Light Processing) method (registered trademark of Texas Instruments (TI) Incorporated).

The shape of the light exit side aperture of the parabolic reflector 3 is not limited to a round shape. Its shape may be square analogous to the display panel. If the light exit side aperture of the parabolic reflector 3 is formed in a square shape, a flat portion made of metal would be formed. The very small aperture or mesh-shaped area may be formed on this flat portion made of metal. Instead of a parabolic reflector, a concave elliptic mirror (elliptic reflector) may be used.

As described above, the projection display according to the present invention has reflector made of metal, and this reflector made of metal is capable of cooling the light source efficiently due to its high efficiency of heat radiation. Moreover the reflector made of metal causes almost no light leak. Therefore, there is no need to provide a light-shielding structure in a vent of a casing of the video display. Accordingly, there are such advantages that the structure of the light source can be simplified, and the like.

In the configuration in which aluminum is coated on the reflector, relatively high reflectance can be obtained in the visible light range. Furthermore, even if the lamp containing mercury bursts, the mercury leaked from the lamp will not flow out from the light source, because the mercury reacts with the aluminum coated on the reflector to be an alloy. Therefore, the configuration can prevent the user from being exposed to mercury and the safety is enhanced. Also, aluminum is used only for the required part. There are such advantages that the cost of the reflector can be reduced, and the like.

In the configuration in which the reflector is made of metal, relatively high reflectance can be obtained in the visible light range. Furthermore, even if the lamp containing mercury bursts, the mercury leaked from the lamp does not flow out from the light source, because the mercury reacts with the reflector made of aluminum to be an alloy. There are such advantages that the user is prevented from being exposed to mercury and the safety is enhanced, and the like.

In the configuration in which the light exit side aperture of the reflector is covered with a transparent plate, there are such advantages that fragments of glass of the lamp can be surely prevented from being scattered when the lamp bursts, and the like.

In the configuration in which heat radiation fins are formed on the outer surface of the reflector, there are such advantages that higher efficiency of heat radiation can be obtained, and the like.

In the configuration in which a mounting structure is formed on the outer surface of the edge of light exit side aperture of the reflector, there are such advantages that mounting structures enable a light source to be easily mounted on, and the like.

When the mounting structure is an engaging part formed on the reflector itself, there are such advantages that engaging part as mounting structures can be easily formed, and the like, since the reflector is made of metal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a projection type video display that optically modulates light emitted from a light source by a display device and projects a video,
    a projection type video display characterized in that said light source has a lamp and a concave reflector which reflects light from the lamp and the reflector is made of a metal selected from the group consisting of iron, copper and stainless steel wherein at least a surface of the reflector which reflects light from the lamp is coated with aluminum,
    wherein said reflector includes a hole for insertion of said lamp, said hole being formed on a rear end of said reflector,
    wherein said hole includes a gap for ventilation,
    wherein a mounting structure is formed on an outer surface of an edge of light exit side aperture of said reflector,
    wherein said mounting structure is an engaging part formed in said reflector itself as a part of said reflector, and
    wherein said engaging part includes a thread part.

2. The projection type video display according to claim 1, wherein the reflector includes a small aperture provided thereon.

3. The projection type video display according to claim 2, wherein a light exit side aperture of said reflector is covered and sealed with a transparent plate.

4. The projection type video display according to claim 1, wherein a lamp containing mercury is provided as said lamp.

5. The projection type video display according to claim 1, wherein a light exit side aperture of said reflector is covered with a transparent plate.

6. The projection type video display according to claim 1, wherein heat radiation fins are formed on an outer surface of said reflector.

* * * * *